United States Patent [19]
Blatt

[11] Patent Number: 4,957,318
[45] Date of Patent: Sep. 18, 1990

[54] VACUUM CUP ASSEMBLY

[75] Inventor: John A. Blatt, 47 Willison, Grosse Pointe Shores, Mich. 48236

[73] Assignee: John A. Blatt, Grosse Pointe Shores, Mich.

[21] Appl. No.: 271,178

[22] Filed: Nov. 14, 1988

Related U.S. Application Data

[63] Continuation-in-part of Ser. No. 165,154, Mar. 7, 1988, Pat. No. 4,828,306.

[51] Int. Cl.⁵ ............................................. B66C 1/02
[52] U.S. Cl. ................................... 294/64.1; 294/64.2; 248/221.1; 248/205.9; 248/223.4
[58] Field of Search ............................ 294/64.1, 64.2; 248/221.1, 205.8, 205.9, 229, 223.4, 316.3, 362, 683; 403/381, 328, 327, 391, 396

[56] References Cited

U.S. PATENT DOCUMENTS

| | | | |
|---|---|---|---|
| 229,670 | 7/1880 | Carrick . | |
| 1,468,110 | 9/1923 | Howe | 248/229 X |
| 1,929,361 | 10/1933 | Liljebladh . | |
| 2,212,156 | 8/1940 | Erdley | 248/229 |
| 2,295,051 | 9/1942 | Roth . | |
| 2,452,406 | 10/1948 | Volkery et al. | 403/391 |
| 2,469,542 | 5/1949 | Becker | 403/391 X |
| 2,565,793 | 8/1951 | Weismantel | 248/205.9 X |
| 2,651,026 | 9/1953 | Roth . | |
| 2,791,623 | 5/1957 | Lock et al. . | |
| 2,858,522 | 10/1958 | Wengen et al. | 403/391 X |
| 3,146,982 | 9/1964 | Budnick | 248/229 X |
| 3,349,927 | 10/1967 | Blatt . | |
| 3,568,959 | 3/1971 | Blatt . | |
| 3,613,904 | 10/1971 | Blatt . | |
| 3,677,584 | 7/1972 | Short . | |
| 3,712,415 | 1/1973 | Blatt et al. . | |
| 4,275,872 | 6/1981 | Mullis . | |
| 4,355,922 | 10/1982 | Sato | 248/229 X |
| 4,453,755 | 6/1984 | Blatt et al. . | |
| 4,480,497 | 11/1984 | Locher | 403/328 X |
| 4,495,834 | 1/1985 | Bauer et al. | 403/328 X |
| 4,708,297 | 11/1987 | Boers | 403/328 X |

Primary Examiner—Margaret A. Focarino
Assistant Examiner—Joseph D. Pape
Attorney, Agent, or Firm—Basile and Hanlon

[57] ABSTRACT

A vacuum cup assembly is disclosed for holding a workpiece when a source of sub-atmospheric pressure is connected to an interior space of the cup. The assembly includes a vacuum cup having a base portion with a shaped fitting and a housing having a complementary shaped aperture with an open end for receiving the shaped fitting on the base portion of the vacuum cup, and a push button member adjacent the open end of the complementary shaped aperture for releasably retaining the vacuum cup fitting within the aperture of the housing. In another aspect of the invention, the housing includes a semi-hemispherical projection, and a mounting bracket having an elongated portion with a longitudinal bore, a first clamp disposed adjacent one end of the elongated portion and engagable with a rod-like member, a second clamp disposed adjacent another end of the elongated portion opposite from the first clamp and engagable with a semi-hemispherical projection on the housing and a single compression bolt engagable through the longitudinal bore for releasably clamping the first and second clamps simultaneously.

19 Claims, 4 Drawing Sheets

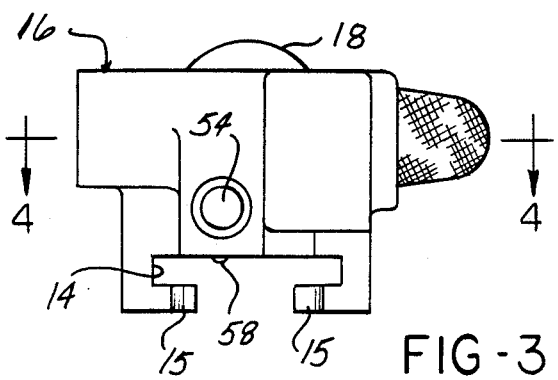
FIG-3
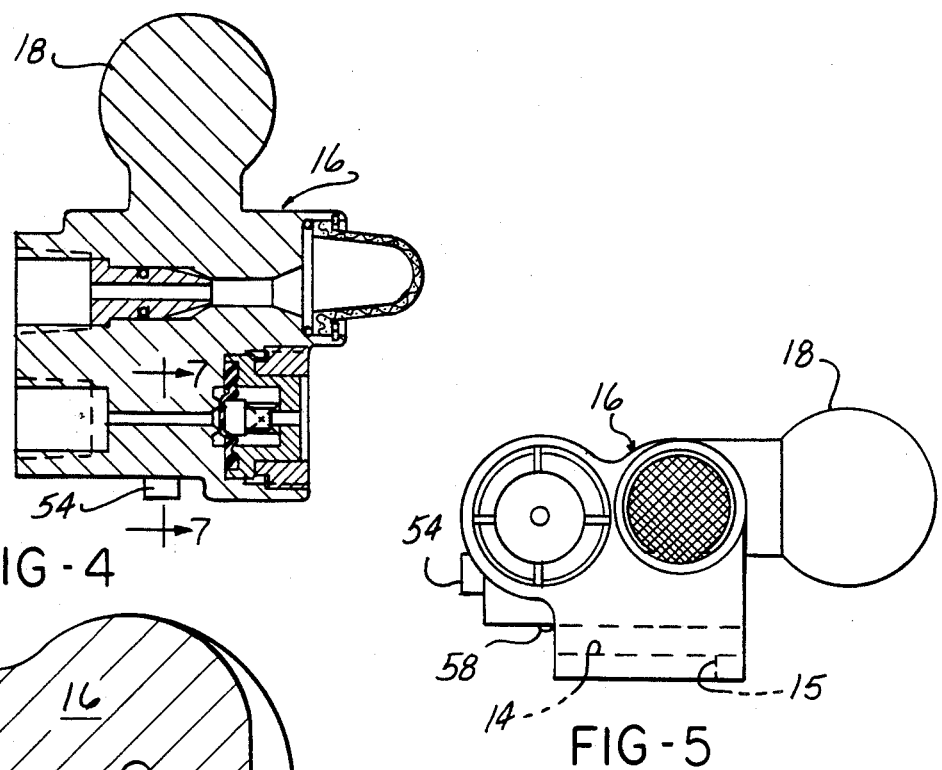
FIG-4
FIG-5
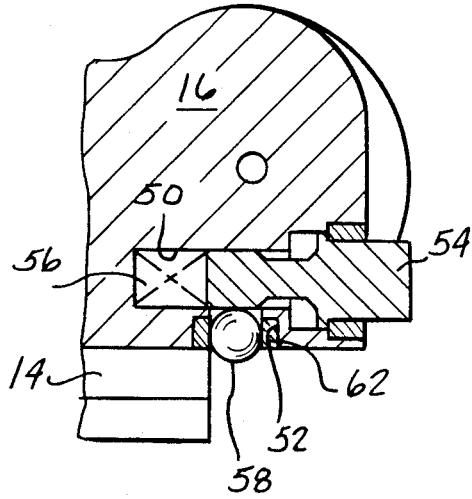
FIG-7
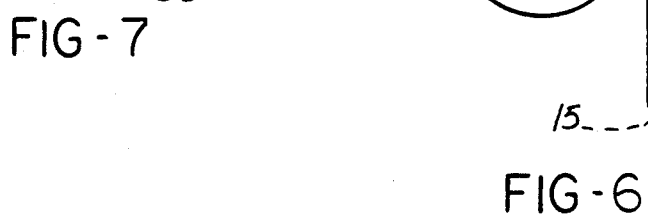
FIG-6

VACUUM CUP ASSEMBLY

BACKGROUND OF THE INVENTION

Related Applications

This application is a continuation-in-part of application Ser. No. 07/165,154 filed Mar. 7, 1988, now U.S. Pat. No. 4,828,306, entitled vacuum cup controlled system. This application is related to U.S. Design Pat. Application Ser. No. 271,803, filed Nov. 14, 1988, tilted Mounting Bracket.

FIELD OF THE INVENTION

The present invention generally relates to a work-gripping vacuum cup assembly employed as a work-gripping element of a work piece transporting or locating device. More particularly, the present invention relates to an improved mounting bracket and a push button assembly for releasably locking the vacuum cut to the housing of the assembly.

BACKGROUND OF THE INVENTION

Devices of this type are widely employed in mass production environments, typically to load and unload sheet metal parts into and from a die or to carry a part, such as an automobile windshield, to the vehicle in which it is to be installed. Several examples of prior vacuum cup assemblies of the type with which the present invention is concerned can be found in U.S. Pat. No. 3,349,927; No. 8,568,959; No. 3,613,904; No. 3,712,415; and No. 4,453,755.

The foregoing patents employ a venturi passage which is connected to a source of air under pressure. Flow of air through the venturi passage induces a subatmospheric pressure in the throat of the venturi, and a passage connecting the venturi throat to the interior of the vacuum cup will induce a vacuum within the cup when the cup is applied to a work piece surface. In the previous patents identified above, the vacuum cup assembly could be adjusted by a variety of joints, such as U.S. Pat. No. 3,349,927 having a clamp at one end while the angular relationship of the cup mount to the arm could be adJusted through radial serrations at the other end. The under surface of the cup mount was provided with a I-shaped slot and into this slot was inserted a cup insert, which was integrally molded into the vacuum cup. The upper face of the insert was provided with an O-ring receiving recess to establish the required seal between the insert and the mount. The vacuum cup and cup insert assembly was retained within the cup mount by a retainer plate and retaining screw. The retaining screw also functioned to maintain the mount and the arm in the desired angular relationship when tightened by interengaging the opposed serrated surfaces between the cup mount and the arm.

In U.S. Pat. No. 3,568,959, an elongated arm was provided which could be adjustably mounted upon a transverse support and secured thereon by a screw assembly. The arm included on one side a cup-shaped recess and an upright slot. A fastening bolt extended through a spring washer and adjustably through a slot in the arm thereafter threading into a bore for anchoring the vacuum cup support in a preselected angular position with respect to the arm. By loosening the bolt, the ball end of the vacuum cup support, which nested within the cup, could be angularly adjusted and thereafter secured in position by tightening the bolt. The vacuum cup was retained in place on the vacuum cup support by a swing plate and bolt.

In U.S. Pat. No. 3,613,904, the vacuum cup body mount included a tapered or cone assembly which projected within a corresponding bore in the bracket assembly and was adjustably secured thereto by a fastener.

Each of these venturi cup assemblies described in the prior patents used mounting brackets having a plurality of individually tightened and adjustable connections or joints to properly orientate the vacuum cup with respect to the work piece.

In the present invention, it is desirable to provide a universal venturi mounting bracket having a single tightening means to releasably secure the venturi cup in the desired orientation with respect to the work piece. In addition, it is desirable in the present invention lo provide increased adjustability of the venturi cup orientation with respect to the mounting bracket. Further, it is also desirable to provide push button means by which the vacuum cup can be quickly removed and replaced on the venturi housing without requiring the use of tools.

SUMMARY OF THE INVENTION

The present invention includes the control system for controlling the application and release of a vacuum to a work piece-gripping vacuum cup as disclosed in my co-pending patent application serial number 07/165,154 filed Mar. 7, 1988. The control system includes a housing of relatively compact dimensions through which a venturi passage of conventional configuration extends from a venturi passage inlet to a discharge vent which is preferably fitted with a silencer. A branch passage extends through the housing from the venturi throat to a control port located to open into the interior of a vacuum cup mounted on the housing. The venturi passage inlet is connected to a source of air under pressure via a supply conduit filled with a normally closed on-off valve which is arranged to be opened for timed intervals. When the valve is opened, air under pressure is discharged from the source through the conduit and through the venturi passage, withdrawing air in a well-known manner from the vacuum cup interior via the branch passage. A one-way check valve in the branch passage accommodates flow through the branch passage in the direction from the control port to the venturi throat but automatically closes to prevent flow through the branch passage in the reverse direction. Flow of air through the venturi passage is for a timed interval sufficient to apply the desired degree of vacuum in the vacuum cup. Upon cessation of the air flow through the venturi passage, the vacuum is held in the cup by closure of the one-way check valve in the branch passage.

To release the vacuum cup from the work piece, a second passage extends through the housing from a second inlet to the control port this second inlet is connected by a second conduit and a second on-off valve to the source of air under pressure. The second on-off valve is normally closed and the second passage within the housing is provided with a spring-loaded, one-way check valve which seats toward the second inlet. The spring loading of the second valve is sufficient to maintain the valve seated in the face of vacuum in the cup but is insufficient to maintain the valve seated when pressure from the source is applied to the second inlet to the housing. Then the second inlet is connected to the pressure source, by opening of the second valve in the second conduit, air under pressure flows past the check valve and through the control port into the vacuum cup to rapidly release the vacuum.

The vacuum cup assembly also includes a push button member located on the housing for releasably locking the vacuum cup to the housing. The housing is supported by a mounting bracket arm, which is in turn adjustably clamped on a rod-like frame member that forms a portion of a movable frame employed to mount and move the vacuum cup as may be required to manipulate the work piece from one position to another. The mounting bracket has an elongated portion with a longitudinal bore. A first clamp is disposed at one end of the elongated portion and is engageable with the rod-like member of the frame. A second clamp is disposed at another end of the elongated portion and is engageable with the semi-hemispherical projection of the housing. A single compression bolt is engageable through the longitudinal bore for releasably clamping the first and second clamps simultaneously, such that the mounting bracket is secured to the rod-like member at a desired longitudinal position along the rod-like member and at a desired angular position with respect to the rod-like member, while the housing is simultaneously secured with respect to the mounting bracket at a desired angular orientation by means of the ball and socket-like joint defined by the semi-hemispherical projection of the housing and the recess of the mounting bracket.

Other objects, features an advantages of the present invention will become apparent by reference to the following specification and to the drawings.

BRIEF DESCRIPTION OF THE DRAWINGS

FIG. 3 is a end view of the housing shown in FIG. 2;

FIG. 4 is a cross sectional plan view of the housing;

FIG. 5 is a side view of the housing shown in FIG. 3;

FIG. 6 is an opposite side view of the housing shown in FIG. 3;

FIG. 7 is a cross sectional detail taken as shown in FIG. 4 showing push button means for releasably retaining the vacuum cup fitting within the housing;

DESCRIPTION OF THE PREFERRED EMBODIMENTS

Figure 1:
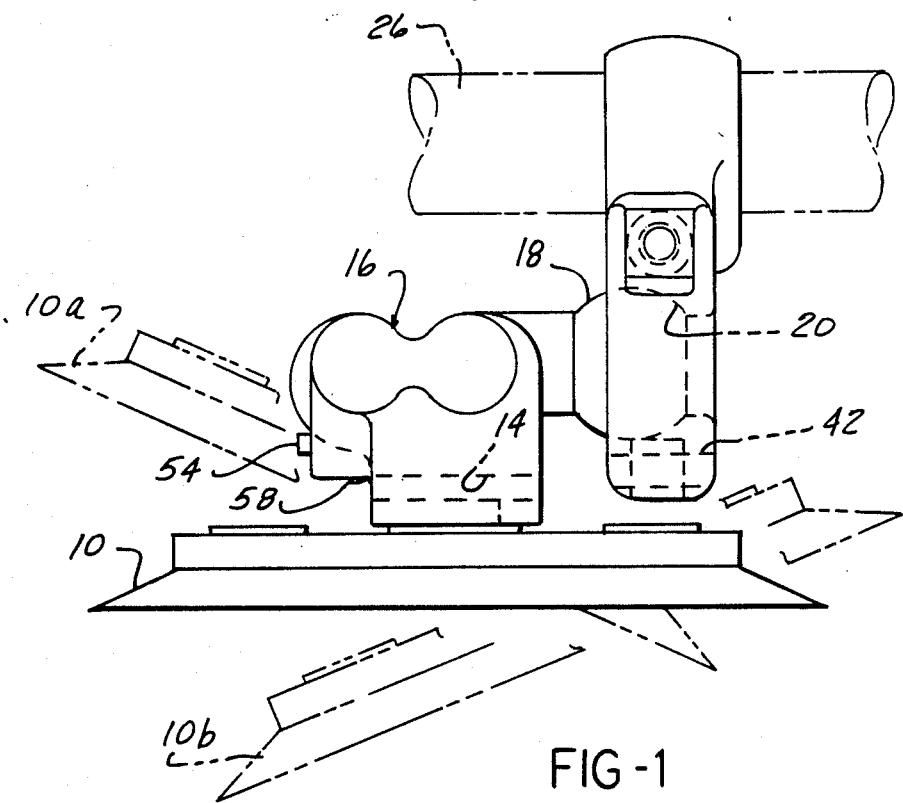
FIG. 1 is a side elevational view of a vacuum cup assembly according to the present invention.
Figure 2:
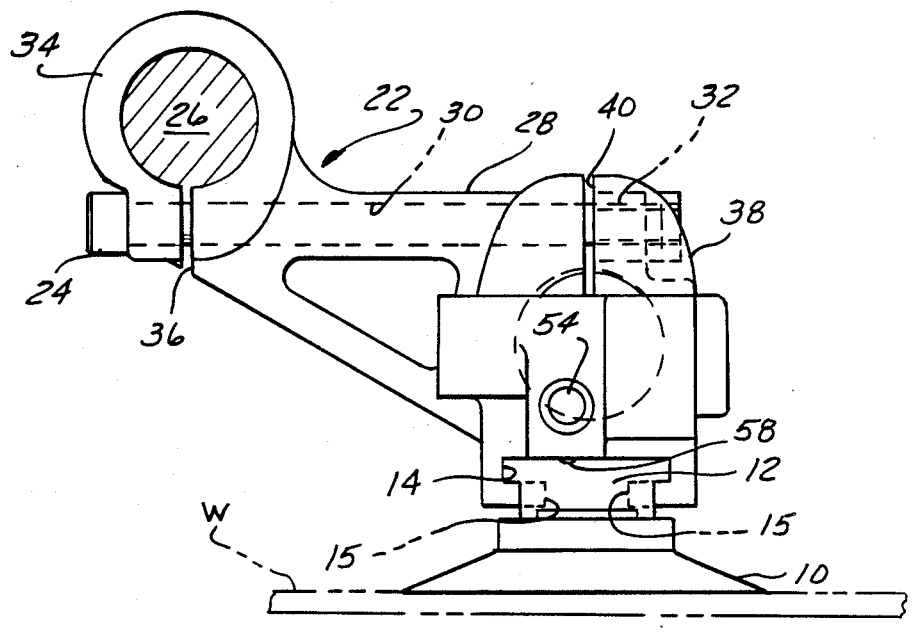
FIG. 2 is an end elevational view of the vacuum cup assembly shown in FIG. 1.
Figure 9:
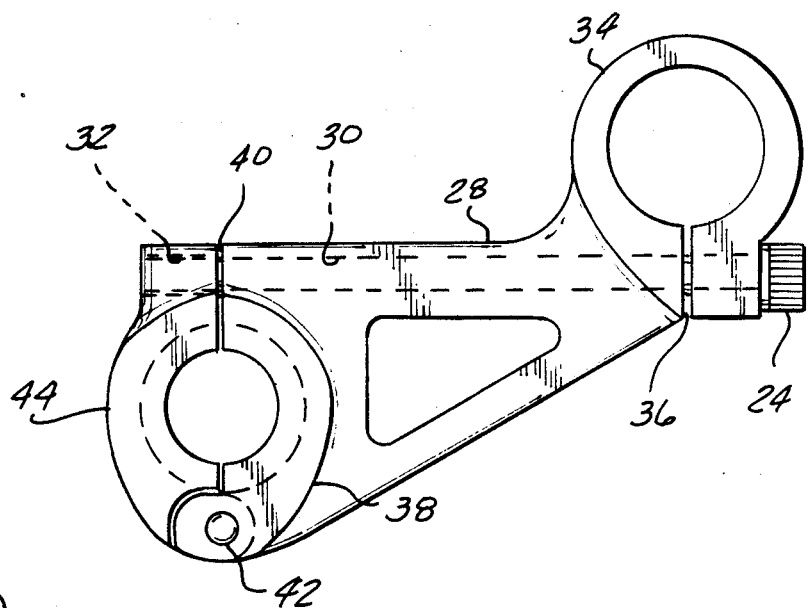
FIG. 9 is an opposite side elevational view of the mounting bracket shown in FIG. 8.
Figure 8:
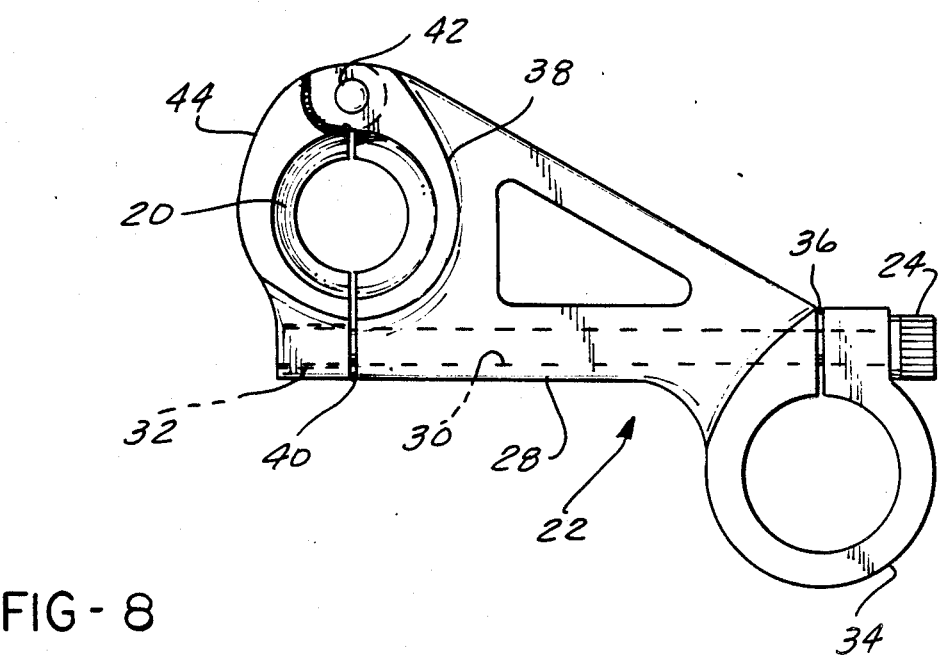
FIG. 8 is a side elevational view of a mounting bracket according to the present invention.
Figure 12:
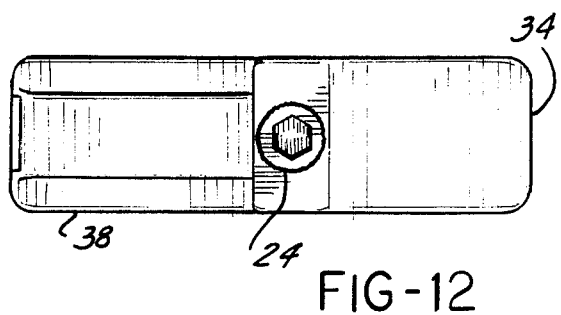
FIG. 12 is an end view looking toward the left with respect to FIG. 8.
Figure 11:
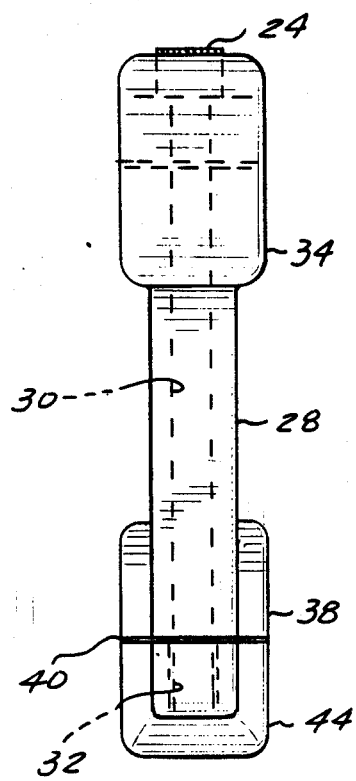
FIG. 11 is a bottom view looking upwardly with respect to FIG. 8.
Figure 10:
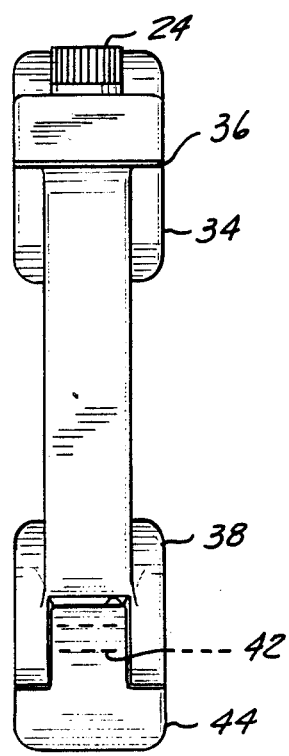
FIG. 10 is a top view looking downwardly with respect to FIG. 8.
Figure 13:
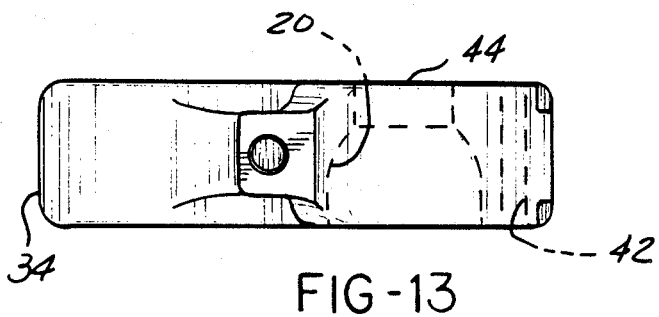
FIG. 13 is an opposite end view looking to the right with respect to FIG. 8.

A vacuum cup designated generally 10 is provided with a fitting 12 at its upper end which is received within a T-slot 14 formed in the bottom of a housing designated generally 16. The housing 16 has protruding shoulders 15, as best shown in FIG. 5, closing one end of the T-slot 14 against passage of the fitting 12. A generally hemispherical projection 18 formed on housing 16 is received within a semi-hemispherical recess 20 in a mounting bracket arm 22 allowing cup rotation of approximately ±23° as illustrated in FIG. 1 by phantom lines designated 10a and 10b respectively. The cup rotation about the center of the hemispherical surfaces facilitates orientation of the cup with respect to the surface of a work piece W. Bracket arm 22 is in turn adjustably clamped on a rod-like frame member 26, which forms part of a movable frame (not shown) employed to mount and move vacuum cup 10 as may be required to manipulate a work piece W from one position to another. Typically, the work piece will be a sheet metal panel which will be gripped by a group of vacuum cups during the transfer operation Such transfer devices are well known and do not per se relate directly to the present invention which is specifically concerned with the push button means for releasably retaining the vacuum cup fitting within the T-slot of the housing, and the single compression bolt means for releasably clamping the mounting bracket to the rod-like member while simultaneously clamping the semi-hemispherical projection of the housing within the recess of the mounting bracket.

The internal configuration and operation of the vacuum cup assembly is described in detail in my co-pending patent application Ser. No. 07/165,154 filed Mar. 4, 1988, which is incorporated herein by reference.

The housing 16 includes push button means for releasably retaining the vacuum cup fitting within the T-slot of the housing. As best shown in FIG. 7, the push button means includes a first aperture 50 formed in the housing 16 adjacent the open end of the T-slot 14. A second aperture 52 is formed in close proximity to the open end of the T-slot 14 in the housing 16 and intersects the first aperture 50. A reciprocating push button member 54 is disposed within the first aperture 50. The push button member 54 is movable between a normal extended position, wherein the push button member 54 extends outwardly from the housing 16, and a second inward position in response to an external force pushing on the push button member 54. Spring means 66 is disposed within the first aperture 50 for urging the push button member 54 toward the normal extended position. A slidable lock member 68 is disposed within the second aperture 52 and normally engages the push button member 64 when in the normal extended or locking position. The push button member 54 when in the normal locking position extends the slidable locking member 58 obstructively in front of the T-slot 14 in the housing 16 for retaining the fitting 12 of the vacuum cup 10 within the T-slot in the housing.

To release the vacuum cup 10 from the housing 16, the push button 54 is pushed inwardly toward the housing 16 thereby moving a narrowed portion 60 of the push button member 54 adjacent the second aperture 52 allowing the slidable lock member 58 to move inwardly toward the housing 16 to remove the obstruction in front of the T-slot 14 allowing passage of the filling 12 to disengage the vacuum cup 10 from the housing 16. The slidable locking member 58 is held within the housing 16 by a retaining element 62. The push button member 54 is held within the housing 16 by a second retaining element 64.

As can best be seen in FIGS. 8–13, the vacuum cup assembly includes a mounting bracket having an elongated portion 28 with a longitudinal aperture 30 therethrough. A threaded portion 82 of the longitudinal aperture 30 is disposed adjacent one end thereof. A first ring clamp 34 is integrally formed on one side of the elongated portion 28 of the mounting bracket adjacent one end thereof. The first ring clamp 34 includes a radially extending slot 36 transversing the longitudinal aperture 30. A second clamp 38 is formed on an opposite side of the elongated portion 28 of the mounting bracket and at an opposite end with respect to the first ring clamp 34. The second clamp 38 includes a radially extending slot 40 transversing the longitudinal aperture 30 in the mounting bracket A hinged joint 42 is provided on the second clamp 38 opposite from the radially extending slot 40. The hinged joint 42 allows a portion 44 of the second clamp 38 to be rotated about the hinged axis thereby allowing insertion of the hemispherical projection 18 on the housing 16 into engagement with the annular semi-hemispherical recess surface 20.

This configuration for the mounting bracket advantageously provides single compression bolt means 24 engageable through the longitudinal aperture 30 of the elongated portion 28 of the mounting bracket to simultaneously clamp the first ring clamp 34 about the rod-like like frame member 26 and the second clamp 38 about the hemispherical projection 18 of the housing 16. This, configuration also facilitates adjusting the orientation of the vacuum cup 10 with respect to the workpiece W by providing a single clamping bolt 24 allowing adjustment of the mounting bracket longitudinally along the rod-like frame member 26 and angularly with respect to the rod-like frame member, as well as the angular adjustment of the hemispherical projection 18 within the annular semi-hemispherical recess surface 20.

While one embodiment of the invention has been described in detail, it will be apparent to those skilled in the art that the disclosed embodiment may be modified. Therefore, the foregoing description is to be considered exemplary rather than limiting, and the true scope of the invention is that defined in the following claims.

The invention claimed is:

1. A vacuum cup assembly for holding a workpiece when a source of sub-atmospheric pressure is connected to an interior space of said cup, comprising:
   a vacuum cup having a base portion with a shaped means for attachment;
   a housing having a complementary shaped aperture means for receiving the shaped means on the base portion of the vacuum cup, the complementary shaped aperture means having an open end, the housing further having a semi-hemispherical projection; push button means, adjacent the open end of the complementary shaped aperture means, for releasably retaining the shaped means on the base portion of the vacuum cup with the complementary shaped aperture means of the housing; and
   a mounting bracket having an elongated portion with a longitudinal bore, a first clamp disposed at one end of the elongated portion and engagable with a rod-like member, a second clamp disposed at another end of the elongated portion and engagable with the semi-hemispherical projection of the housing, single compression bolt means engagable through the longitudinal bore for releasably clamping the first and second clamps simultaneously, and a hinged joint formed on the second clamp disposed opposite from the longitudinal bore, wherein a portion of the second clamp can be hingedly rotated about the hinged joint allowing insertion of the semi-hemispherical projection on the housing into engagement with an annular semi-hemispherical recess surface on the second clamp, said portion of the second clamp including a portion of the longitudinal bore and said portion of the longitudinal bore having threads engagable with the single compression bolt means.

2. The vacuum cup assembly of claim 1, wherein the push button means comprises:
   a slidable locking member movable outwardly with respect to the housing to obstruct the passage of the shaped means on the base portion of the vacuum cup such that the vacuum cup is, unable to move out of engagement with the complementary shaped aperture means in the housing.

3. The assembly of claim 1 wherein the push button means comprises:
   a first aperture disposed in the housing adjacent the complementary shaped aperture means;
   a second aperture communicating with the first aperture and opening in close proximity to the open end of the complementary, shaped aperture means;
   a push button member reciprocally engagable within the first aperture for movement between a normal locking position and a releasing position.
   biasing means for urging the push button member toward the normal locking position; and
   a movable looking member slidably engaged within the second aperture and engagable with the push button member when in the normal locking position to extend obstructively in front of the complementary shaped aperture means for releasably retaining the shaped means on the base portion of the vacuum cup within the complementary shaped aperture means in the housing, wherein movement of the push button member against the biasing means enables slidably retracting movement of the locking member inwardly toward the housing allowing removal of the vacuum cup from the complementary shaped aperture means in the housing.

4. The assembly of claim 1, wherein the shaped means comprises a T-shaped fitting formed on the base portion of the vacuum cup.

5. The assembly of claim 4, wherein the complementary shaped aperture means comprises a T-shaped slot formed in the housing.

6. The assembly of claim 1, wherein the first clamp is disposed on one side of the elongated portion of the mounting bracket adjacent a first end, and the second clamp is formed on another side of the elongated portion of the mounting bracket opposite from the first clamp and disposed adjacent an end of the elongated portion opposite from the first clamp.

7. The assembly of claim 6, further comprising the first clamp having a first radially extending slot transversing the longitudinal bore, and the second clamp having a second radially extending slot transversing the longitudinal bore and wherein the hinged joint formed on the second clamp is disposed opposite from the second radially extending slot.

8. The assembly of claim 1, wherein the semi-hemispherical projection on the housing and the second clamp provide vacuum cup rotation in the range of approximately 23° with respect to an axis disposed at a right angle with respect to the longitudinal bore and offset therefrom.

9. A vacuum cup assembly for holding a workpiece when a source of sub-atmospheric pressure is connected to an interior space of said cup, comprising:
   a housing having a semi-hemispherical projection; and a mounting bracket having an elongated portion with a longitudinal bore, a first clamp disposed adjacent one end of the elongated portion and engagable with a rod-like member, a second clamp disposed adjacent another end of the elongated portion and engagable with the semi-hemispherical projection of the housing, single compression bolt means engagable through the longitudinal bore for releasably clamping the first and second clamps simultaneously, hinge means disposed on the second clamp opposite from the longitudinal bore, such that a portion of the second clamp is hingedly rotatably about the hinge means, said portion of the second clamp including a portion of the longitudinal bore, said portion of the longitudinal bore including threads engagable with the single compression bolt means.

10. The assembly of claim 9, wherein the first clamp is disposed on a first side of the elongated portion of the mounting bracket adjacent one end, and the second clamp is disposed on a opposite side of the elongated portion with respect to the first clamp and at an opposite end of the elongated portion with respect to the first clamp.

11. The assembly of claim 10, further comprising the first clamp having a first radially extending slot transversing the longitudinal bore, and the second clamp having a second radially extending slot transversing the longitudinal bore and wherein the hinge means comprises a hinged joint disposed on the second clamp opposite from the second radially extending slot.

12. The assembly of claim 9, wherein the hinge means comprises a hinged joint allowing insertion of the semi-hemispherical projection on the housing into engagement with an annular semi-hemispherical recess surface on the second clamp.

13. The assembly of claim 9, wherein the semi-hemispherical projection on the housing and the second clamp allow rotational orientation of the housing with respect to the mounting bracket in the range of approximately 23° with respect to an axis at right angles to the longitudinal bore and offset therefrom.

14. The assembly of claim 9 further comprising:
a vacuum cup having a base portion with shaped means for attachment;
said housing having complementary shaped aperture means for receiving the shaped means on the base portion of the vacuum cup, said complementary shaped aperture means having an open end; and
push button means, adjacent the open end of the complementary shaped aperture means, for releasably retaining the vacuum cup within the complementary shaped aperture means of the housing.

15. The vacuum cup assembly of claim 14, wherein the push button means comprises:
a slidable locking member movable outwardly with respect to the housing to obstruct the passage of the shaped means on the base portion of the vacuum cup, such that the vacuum cup is unable to move out of engagement with the complementary shaped aperture means in the housing.

16. The assembly of claim 14 wherein the push button means comprises:
a first aperture disposed in the housing adjacent the complementary shaped aperture means;
a second aperture communicating with the first aperture and opening in close proximity to the open end of the complementary shaped aperture means;
a push button member reciprocally engagable within the first aperture for movement between a normal locking position and a releasing position;
biasing means for urging the push button member toward the normal locking position; and
a movable locking member slidably engaged within the second aperture and engagable with the push button member when in the normal locking position to extend obstructively in front of the complementary shaped aperture means for releasably retaining the shaped means on the base portion of the vacuum cup with the complementary shaped aperture means in the housing, wherein movement of the push button member against the biasing means enables the slidably retracting movement of the locking member inwardly toward the housing allowing removal of the shaped means on the base portion of the vacuum cup from the complementary shaped aperture means in the housing.

17. The assembly of claim 14 wherein the shaped means comprises a T-shaped fitting formed on the base portion of the vacuum cup.

18. The assembly of claim 17 wherein the complementary shaped aperture means comprises a T-shaped slot formed in the housing.

19. A vacuum cup assembly for holding a workpiece when a source of sub-atmospheric pressure is connected to an interior space of said cup, comprising:
a vacuum cup having a base portion with a T-shaped fitting;
a housing having a semi-hemispherical projection, and an open ended T-shaped slot for receiving the T-shaped fitting on the base portion of the vacuum cup, a first aperture disposed in the housing adjacent the open end of the T-shaped slot, a second aperture communicating with the first aperture and opening in close proximity with the T-shaped slot;
a push button member reciprocally engagable within the first aperture for movement between a normal locking position and a releasing position;
biasing means for urging the push button member toward the normal locking position;
a slidable locking member movably engagable within the second aperture and engagable with the push button member when in the normal locking position to extend obstructively in front of the T-shaped slot for retaining the T-shaped fitting on the base portion of the vacuum cup within the T-shaped slot in the housing, wherein movement of the push button member against the biasing means enables retracting movement of the locking member inwardly with respect to the housing for removing the T-shaped fitting on the base of the vacuum cup from the T-shaped slot in the housing; and
a mounting bracket having an elongated portion of the mounting bracket with a longitudinal bore, a first clamp disposed adjacent one end of the elongated portion and engagable with a rod-like member, a second clamp disposed adjacent another end of the elongated portion opposite from the first clamp and engagable with the semi-hemispherical projection of the housing, and single compression bolt means engagable through the longitudinal bore for releasably clamping the first and second clamps simultaneously, wherein the first clamp is disposed on one side of the elongated portion of the mounting bracket adjacent one end thereof and has a first radially extending slot transversing the longitudinal bore, and the second clamp is disposed on a side of the elongated portion of the mounting bracket opposite from the first clamp and adjacent an end of the elongated portion opposite from the first clamp, the second clamp having a second radially extending slot transversing the longitudinal bore and a hinged joint formed on the second clamp opposite from the second radially extending slot, wherein a portion of the second clamp is hingedly rotatable about the hinged joint, said portion of the second clamp including a portion of the longitudinal bore, said portion of the longitudinal bore having threads engagable with the single compression bolt means.

* * * * *

UNITED STATES PATENT AND TRADEMARK OFFICE
CERTIFICATE OF CORRECTION

PATENT NO. : 4,957,318

DATED : September 18, 1990

INVENTOR(S) : John A. Blatt and David Crorey

It is certified that error appears in the above-identified patent and that said Letters Patent is hereby corrected as shown below:

On the Title Page, in the Inventor Block, after "48236", please insert --David Crorey, 54592 Coventry Lane, Utica, Mich. 48087--.

Signed and Sealed this

Twenty-first Day of April, 1992

Attest:

HARRY F. MANBECK, JR.

*Attesting Officer*  *Commissioner of Patents and Trademarks*